United States Patent
Moyer et al.

[15] 3,685,714
[45] Aug. 22, 1972

[54] SOLDERING APPARATUS

[72] Inventors: Henry F. Moyer, Millbury; Robert G. Revells, Toledo, both of Ohio

[73] Assignee: Libbey-Owens-Ford Company, Toledo, Ohio

[22] Filed: July 20, 1970

[21] Appl. No.: 56,528

[52] U.S. Cl. ..................228/6, 228/41, 228/49, 228/52
[51] Int. Cl. ..................B23k 1/00, B23k 5/00
[58] Field of Search..........228/4, 6.5, 41, 46, 49, 51, 228/52, 6; 219/85

[56] References Cited

UNITED STATES PATENTS

| | | | |
|---|---|---|---|
| 949,330 | 2/1910 | Phelps | 228/41 |
| 1,826,710 | 10/1931 | Adams | 219/85 |
| 2,296,158 | 9/1942 | Gardner | 228/41 |
| 3,247,355 | 4/1966 | Olsen | 219/85 |
| 3,403,242 | 9/1968 | Cropp et al. | 228/49 X |
| 3,521,804 | 7/1970 | Jacobs | 228/51 |
| 3,577,627 | 5/1971 | Woodward | 228/49 X |

*Primary Examiner*—John F. Campbell
*Assistant Examiner*—Ronald J. Shore
*Attorney*—Collins and Oberlin

[57] ABSTRACT

Method of and apparatus for completing the production of electrically heated automobile backlights by automatically soldering flexible, braided wire bus bars to strip electrodes fired onto opposite side margins of the backlight and connecting a network of fine lines through which electrical energy can be conducted. Included are means and procedures for automatically locating the backlights relative to special soldering equipment and producing relative movement therebetween to effect the soldering.

6 Claims, 18 Drawing Figures

PATENTED AUG 22 1972

3,685,714

INVENTORS
Henry F. Moyer and
Robert G. Revells
BY Collins & Oberlin
ATTORNEYS

INVENTORS
Henry F. Moyer and
Robert G. Revells
BY Collins & Oberlin
ATTORNEYS

SOLDERING APPARATUS

BACKGROUND OF THE INVENTION

1. Field of the Invention

This invention relates broadly to soldering, welding and the like and, more particularly, to improvements therein that make it possible to automatically and simultaneously join metal parts together at a plurality of points during movement thereof along a substantially continuous production line and with a minimum of interruption of such movement.

2. Description of the Prior Art

Electrically heated windows, and particularly backlights for automobiles, are fairly well known for preventing the accumulation of ice and fog, and they are generally made by starting out with a flat glass sheet that has been pattern-cut to fit the particular window opening. This sheet is then bent, under heat, to conform to the curvature of the automobile body but, before bending, has applied to its inboard surface a number of spaced, very narrow, parallel lines of a conducting frit material that extend along the length of the sheet and are connected adjacent opposite margins thereof by strip electrodes of the same material. Under the heat of bending, the frit of these lines and electrodes is fired on to the glass. Subsequently, flexible bus bars, that are part of a so-called "harness" made of braided wire, have to be soldered onto the fired-on strip electrodes to provide suitable means through which current can be fed to the electrically conducting window to heat the same after it is in operative position in the automobile; and, heretofore, this soldering has been largely a hand operation, carried out by conventional procedures and employing available equipment.

SUMMARY OF THE INVENTION

While not restricted thereto, the present invention is especially well adapted for use in automatically soldering flexible bus bars of the above character to the fired-on strip electrodes in producing electrically heated windows and backlights for automobiles in a high speed, production line operation, and it will be specifically described in that connection here.

Various objects and advantages of the invention will become apparent during the course of the following description when read in connection with the accompanying drawings.

In the drawings, wherein like numerals are employed to designate like parts throughout the same.

DESCRIPTION OF PREFERRED EMBODIMENTS

Figure 1:
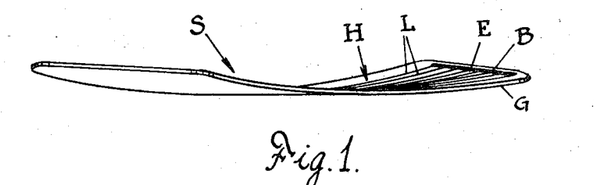
FIG. 1 is a perspective view of a glass sheet provided with an electrical heating system.

Referring now more particularly to FIG. 1, there is illustrated a sheet of glass S, of a pattern-cut shape and bent curvature generally characteristic of rear windows or backlights for automobiles, and that is provided with an electrical heating system or grid designated by the letter H. This grid is made up of a number of elements capable of conducting electrical energy but narrow enough not to materially interfere with a driver's vision and, as shown, they are in the form of very fine stripes or lines L, arranged in spaced, substantially parallel relation across the length and on the inner surface of the glass sheet, together with electrodes E at right angles thereto and which integrally connects them adjacent oppositely disposed edges of the sheet.

Figure 2:
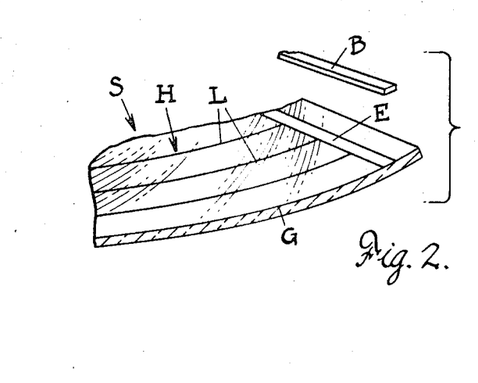
FIG. 2 is a fragmentary, exploded perspective view thereof.

Such parallel conductive stripes L and oppositely disposed electrodes E may be of any conductive material, such for example as a silver frit that can be applied by silk screen or similar processes to one surface of the sheet of glass G while the same is substantially flat. During subsequent treatment of the sheet to heat and bend the same to the desired curvature, the frit material will be fired-on and so become tightly bonded to the glass surface. Thereafter, when the sheet has cooled to room temperature, after having been tempered or otherwise annealed, suitable bus bars must be secured to the electrodes for eventual connection or harnessing to the electric power system of the automobile; and, as illustrated in FIGS. 1 and 2, flexible or braided wire type bus bars B can be positioned on and in full contact with the electrodes E of the grid type heating system H preparatory to permanently fixing them thereto by soldering.

Figure 5:
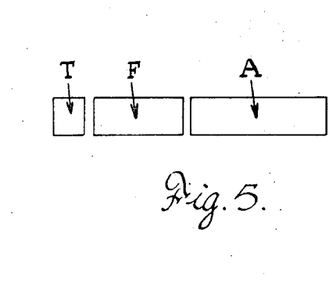
FIG. 5 is a diagrammatic view of a production line or complete working area in which the soldering apparatus of FIGS. 3 and 4 is included.

As pointed out above, the present invention can be utilized to automatically and expeditiously solder elements such as the bus bars B to the electrodes E as part of a substantially continuous production line operation, and there has been illustrated diagrammatically in FIG. 5 of the drawings one way in which a soldering apparatus A, constructed in accordance with the invention, can be incorporated, between an assembly table or section T and a feeder conveyor F, into such a line.

Figures 9, 10, 11, 12:
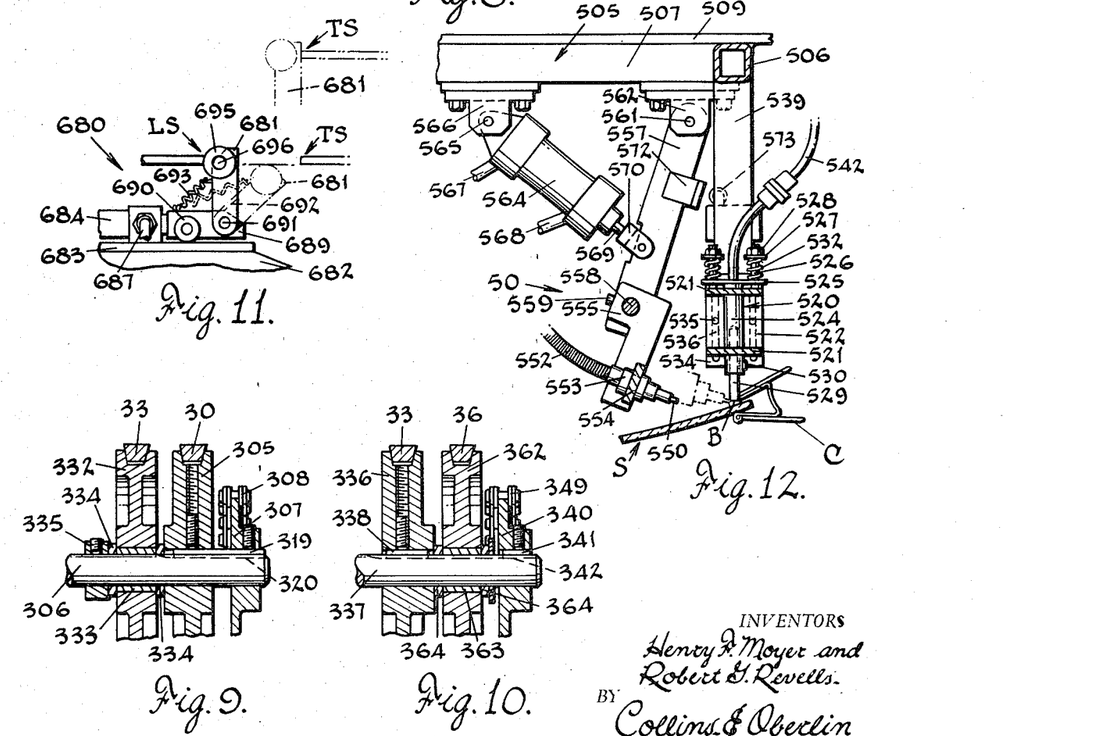
FIG. 9 is a transverse vertical sectional view as taken on the plane of line 9—9 in FIG. 6.
FIG. 10 is a transverse vertical sectional view as taken on the plane of line 10—10 in FIG. 6.
FIG. 11 is a detail view of a glass sheet clamping device.
FIG. 12 is a detail view of one of the solder iron and solder feeding units.

With this arrangement, and in combination with whatever fluxing and/or tinning may be desirable, the bus bars B can be positioned in contact with, and temporarily secured in the desired relationship to, the electrodes E by clamping means, such as shown at C in FIG. 12, manually applied thereto on the assembly table T. From thence the glass sheets so prepared are substantially continuously supplied to the soldering apparatus A over and by the conveyor F.

Figure 3:
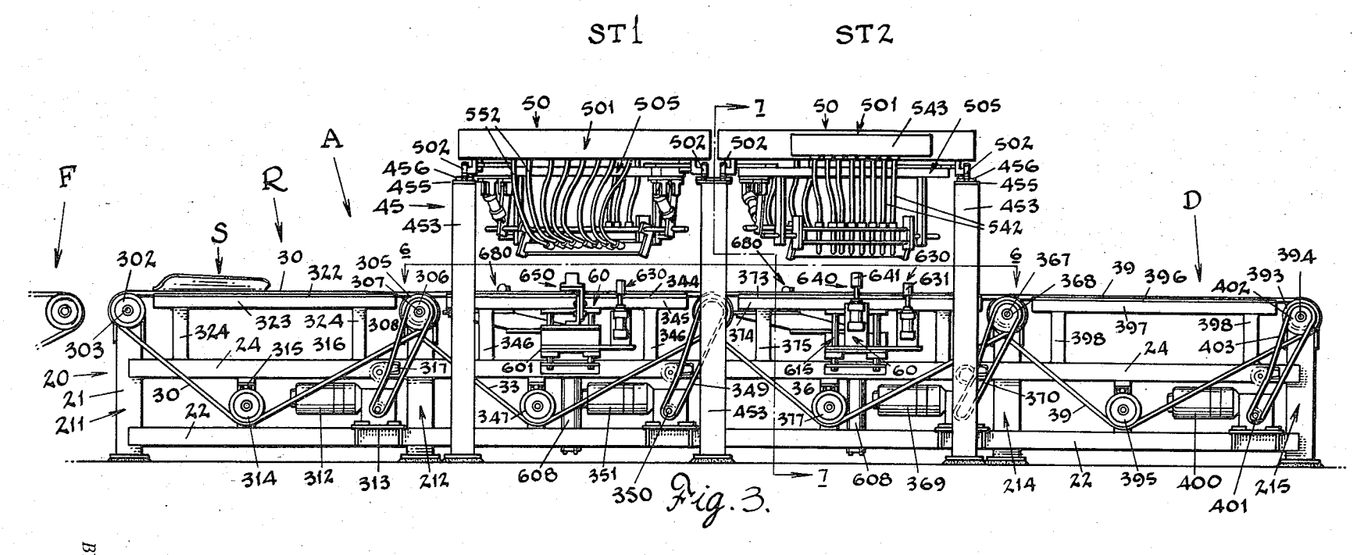
FIG. 3 is a side elevational view of a soldering apparatus constructed in accordance with this invention.
Figure 4:
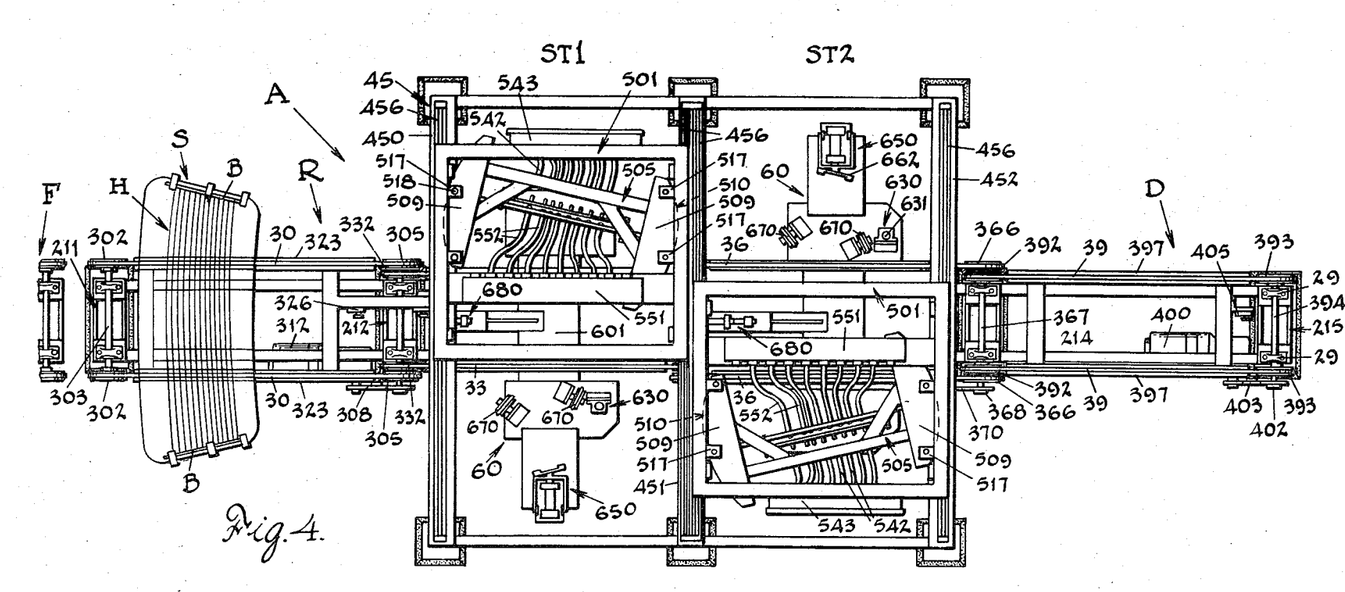
FIG. 4 is a plan view thereof.

As best shown in FIGS. 3 and 4, the soldering apparatus A includes a series of independently driven, overlapping conveyors that transfer a sheet supplied thereto from a receiving area or station, designated by the letter R, to a first soldering station ST1, then to a second soldering station ST2 and, finally to a discharge area or station D. At station ST1 one of the bus bars B is soldered to the electrode E at one side of the sheet and the second bus bar is soldered to the oppositely disposed electrode E at station ST2. This sequence allows the soldering means in each station to be readily adjusted in accordance with the parallel or angular relation of the sides of the sheet to the transverse axis, with the distance of the electrodes from the edges of the said sides, and with the length of the sheet.

Figure 8:
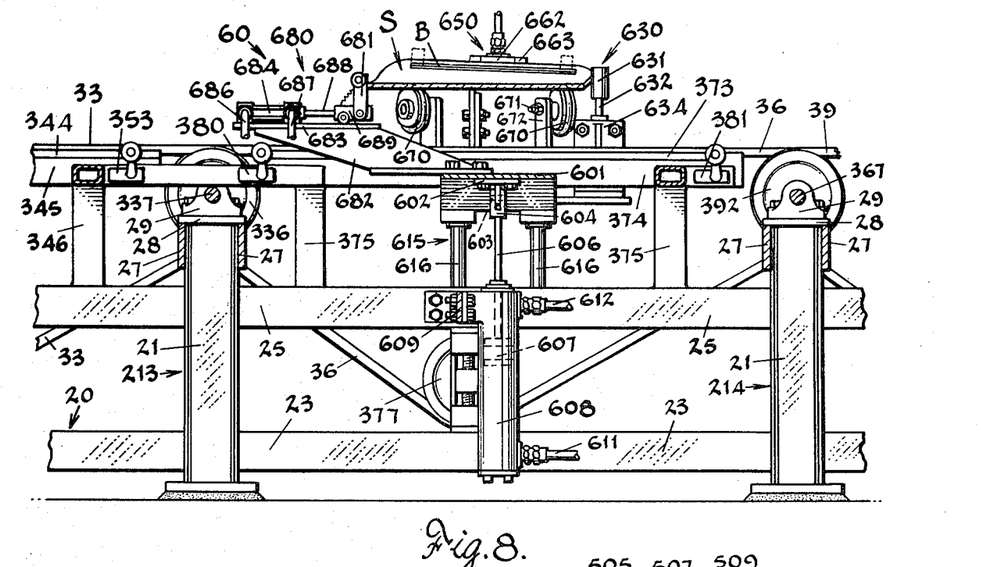
FIG. 8 is a longitudinal vertical sectional view as taken on the plane of line 8—8 in FIG. 6.
Figure 13:
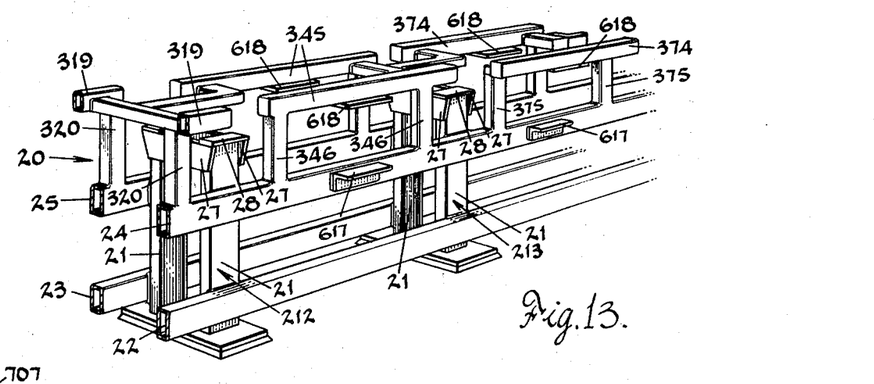
FIG. 13 is a fragmentary perspective view of the framework for the soldering apparatus.

With more specific reference to the structure of the soldering apparatus A, each of the driven conveyors associated with stations R, ST1, ST2 and D comprises a pair of conveyor belts running parallel with the longitudinal axis of the apparatus and is independently driven by an individual motor. The main framework of the apparatus (FIG. 13) is designated in its entirety by the numeral 20 and includes pairs of vertically disposed, floor-based columns 21, forming pedestals 211, 212, 213, 214 and 215, and longitudinally disposed pairs of channels or tubular bars that are arranged in vertically spaced parallel relation as at 22–23 and 24–25. The bars 22–25 are secured to the outwardly directed surfaces of the columns 21. The columns 21 of each pedestal are arranged in transverse relation to one another and interconnected at their upper ends by horizontally disposed bars 27 and, as seen in FIG. 8, mounting plates 28 are provided on the bars 27 for shaft bearings 29. Also, as best shown in FIG. 4, the pair of conveyor belts 30 in the receiving station R are arranged in outwardly spaced but parallel relation to the pair of belts 33 in the station ST1 which are also arranged inwardly of the conveyor belts 36 in the station ST2. The pair of belts 36 are outwardly spaced but parallel to the pair of conveyor belts 39 in the discharge station D.

More specifically, at the entry end of the apparatus, the belts 30 are trained about idler pulleys 302 that are fixed on the opposite ends of a shaft 303 journaled in a pair of bearings 29 on plates 28 of the pedestal 211. At the exit end of the receiving station R, the belts 30 are trained about drive pulleys 305 keyed to the opposite ends of a shaft 306 journaled in bearings 29 on plates 28 of the pedestal 212. At one end of the shaft 306 (FIG. 9), a sprocket 307 is provided to turn the shaft by means of the sprocket chain 308. This chain belt is trained about a sprocket 310 on the output shaft of a source of power, such as a motor 312, that is supported by a mounting plate 313 on the frame bar 22 (FIG. 3). As also seen in FIG. 3, tautness in each of the belts 30 is adjusted by means of an associated pulley 314 rotatably carried on the shaft of an adjusting device indicated by the numeral 315 mounted on the bars 22–25. In similar manner, the desired tautness of sprocket chain belt 308 can be obtained by the idler pulley 316 on adjusting device 317.

An idler pulley 332 for each conveyor belt 33 is mounted on the shaft 306 inwardly of each of the drive pulleys 305. As viewed in FIG. 9, one pulley 305 and the sprocket 307 are fixed on the shaft 306 by a bar key 319 in keyway 320 while the adjacent idler pulley 332 is independently rotatable on a sleeve bearing 333 located between spacing washers 334; a lock collar 335 on the shaft 306 maintaining the position of the washers 334 and thereby the spacing of pulley 332 from the pulley 305. The upper flight of each belt 30 traverses a track 322 carried by a rail 323 that is supported by posts 324 on a bar 24 or 25. As will hereinafter be more fully described, operation of the motor 312 is controlled by suitably located switch devices, such as is designated by the numeral 326 in the exit area of the receiving station R (FIG. 4).

In the case of the pair of conveyor belts 33, they are trained about the idler pulleys 332 and drive pulleys 336 fixed on a shaft 337 that is journaled in bearings 29 on the pedestal 213. As viewed in FIG. 10, one drive pulley 336 is keyed to the shaft 337 by a bar 338 while a sprocket 340 is keyed to the shaft by bar 341; both bars being received in keyway 342. In this situation, the idler pulleys 362 for conveyor belts 36 are located outwardly of the drive pulleys 336 and, as in Fig. 10, are supported by sleeve bearings 363 between washers 364. Each conveyor belt 33, in its upper flight, traverses a track 344 carried by a bar 345 supported by posts 346 on the bars 24 and 25. A tautness adjusting pulley 347 is also provided for each of the belts 33. The sprocket 340 is driven by sprocket chain belt 349 also trained about sprocket 350 on the output shaft of a motor 351. As in the instance of the motor 312, operation of the motor 351 is controlled by switch devices 352 and 353 on the framework 20 (FIG. 4) as will later be described.

Each conveyor belt 36 is trained about a related drive pulley 366 (FIG. 6) fixed on a shaft 367 journaled in bearings 29 on the plates 28 of the pedestal 214 (FIG. 8). In similar manner to that illustrated in FIG. 9, one drive pulley 366 closely adjoins an associated drive sprocket 368 (FIG. 4) which together are fixed to the shaft 367 by a common bar key; with the sprocket 368 being driven from a motor 369 by a sprocket chain belt 370 also trained about a sprocket 371 on the output shaft thereof. The upper flight of each belt 36 traverses a track 373 on bar or rail 374 that is supported by posts 375 on the bars 24 and 25 while tautness of each belt is maintained by an adjustably mounted pulley 377 about which the lower flight is trained. Also, switch devices 380 and 381 on the framework 20 are adapted to control operation of the motor 369.

Similarly, the conveyor belts 39 of the discharge station D are trained about idler pulleys 392 on the shaft 367, drive pulleys 393, on a shaft 394 journaled in bearings 29 on the plates 28 of pedestal 215, and tautness adjusting pulleys 395 about which the lower flight of each belt is trained. The positions of the idler pulleys 392 relative to the drive pulleys 366 are typically similar to the spaced relation of the idler pulley 332 to the driven pulley 305 on the shaft 306, as in FIG. 9. The upper flight of each belt 39 also similarly traverses a track 396 on bars 397 supported by posts 398 on the bars 24 and 25 of the framework 20. The shaft 394 and drive pulleys 393 are operably connected to a motor 400 by a sprocket 401 on the motor output shaft, a sprocket 402 fixedly mounted on the shaft 394 and sprocket chain belt 403 trained thereabout. Operation of the motor 400 is controlled by means of a switch device 405 in the exit area of the discharge station D (FIG. 4).

THE SOLDERING UNITS

The soldering units for the stations ST1 and ST2, as best shown in FIGS. 3, 4, 7 and 12, are mounted on a structural framework designated in its entirety by the numeral 45 and each unit is designated in its entirety by the numeral 50.

The framework 45 includes three horizontally disposed, parallel cross beams 450, 451 and 452 located above the framework 20 and connecting the upper ends of six vertically disposed, floor-based columns 453. The end cross beams 450 and 452 carry plates 455 on which pairs of guide rails 456 are attached and the medially located cross beam 451 has a similar plate 455 on which two pairs of guide rails 456 are mounted.

Each soldering unit 50 includes a carriage 501 equipped on each of its transversely disposed sides with casters 502 that are adapted to travel on the plates 455 between the pairs of guide rails 456. Each unit 50 also includes a substantially U-shaped frame 505 formed by a medial web sector 506 and leg sectors 507 at the ends thereof (FIG. 12). Plates 509, having outwardly directed arcuate edge surfaces 510, are integrally joined with the upper surface of the frame 505 and located at the opposite ends thereof. The plates 509 serve to support the frame 505 on the related carriage 501 and to permit radial movement of the unit to locate the functional elements thereof in parallel relation to the angular position of the electrodes E on the sheet S. Moreover, when the length of the sheet varies, the carriages can be moved inwardly or outwardly with respect to the rails 456 after which each carriage can be fixed in position as by a set-screw 514 carried by a bracket 515 on the carriage (FIG. 7) and secured by a lock-nut 516.

By these means the functional elements of each of the soldering units 50 in the soldering stations ST1 and ST2 can be located in outwardly spaced relation from and on one side of the longitudinal axis of the framework 20 a distance substantially equal to the distance of one electrode area from the transverse axis of the glass sheet.

Each carriage 501 is equipped with supporting brackets 517, having notches in which the surfaces of arcuate edges 510 are received, and with set-screws 518 to secure the frame 505 in any adjusted position. Thus, the soldering unit 50 at the station ST1 and the like unit at the station ST2 can be readily and mutually adjusted to positions that will accommodate glass sheets of different sizes as well as varying lengths and contoured outlines. In this connection, it will be observed by comparing in FIGS. 4 and 6 that the frame 505 in station ST1 (FIG. 4) is angularly located to suit the position of the electrode E1 (FIG. 6) along one side of the glass sheet while the frame 505 in station ST2 is arranged at the desired angle to suit the position of the electrode E2 along the opposite end of the sheet. In other words, the soldering unit at station ST1 is positioned to functionally secure a bus bar B on the electrode E1 (FIG. 6) and the soldering unit at the station ST2 is similarly but oppositely positioned to secure a bus bar B on the electrode E2.

Each of the soldering units 50 carries a plurality of soldering irons 520 that are supported on the respective frames 505 by means of horizontally disposed and vertically spaced plates 521 connected by end plates 522 (FIG. 12). Each iron 520 includes a cylindrical body portion 524 extending through plates 521 and having a plate 525 secured to its upper end which is received on threaded rods 526 fixed to the upper plate 521 and equipped with a washer 527 and nut 528. The body of the iron is drilled in its lower end to receive a tip 529 which is secured therein by a set-screw 530. A coil spring 532 is interposed between the plate 525 and the washer 527 to resiliently urge the body 524 of the iron downwardly and the tip 529 onto the bus bar B when the glass sheet is in operative position.

Each end plate 522 is attached to a plate 534 by screws 535 passed through vertically disposed slots 536 in the plate 534 and threaded in the plate 522. The plates 534 have outwardly directed shafts 538 (FIG. 7) that are supported in bars 539, depending from the web sector 506 of the frame 505, and secured therein by suitable set-screws. The irons 520 can thus be adjusted vertically by shifting of the end plates 522 relative to the plates 534; horizontally by sliding of the shafts 538 relative to the bars 539 and radially by rotation of the shafts relative to said bars. Each of the plurality of soldering irons 520 is connected by way of a cable 542 to a control device located in a panel box 543 mounted on the carriage 501 and thereby to sources of electrical energy; means being provided in the panel box for controlling the heating temperature of the irons.

Solder 550, in the form of a substantially continuous length of wire, is supplied from feeder means contained in a box 551; operation of said feeder means forming no part of the instant invention other than, during intermittent stages of operation, to meter certain amounts or lengths of the solder wire preparatory to each soldering operation. The wire for use with each soldering tip 529 is carried through an individual conduit 552 to a feeding tube or device 553 mounted by a bar 554 attached to end plates 555 on swingably supported arms 557. More particularly, the end plates are mounted on a shaft 558 that is releasably secured in each arm 557 by a set-screw to bring the axes of the feeding devices 553 into a plane at which the solder wire will be properly fed to the soldering tips 529 while they are in contact with a bus bar. Also, the shaft 558 can be shifted in endwise direction relative to the arms 557 to locate the tubes or devices 553 according to adjusted positioning of the tips 529.

As illustrated in FIG. 12, the arms 557 and feeding devices 553 are shown in full line in a retracted, rest position and the devices in an advanced, functional position in broken line. For this purpose, each arm 557 is pivotally carried on the frame 505 by an axle pin 561 supported by a bracket 562 and is caused to move between the above-mentioned positions by an associated cylinder actuator 564. Each cylinder is pivotally supported by an axle pin 565 and a bracket 566 on the frame 505 and is supplied with fluid under pressure through conduits 567 and 568 connected to its head and rod ends; the rod 569 of each cylinder being connected to the associated arm 557 by way of a clevis member 570. One arm 557 is provided with a switch bracket 572 which is adapted to actuate the arm of a switch device 573 supported on an adjacent arm 539. Generally stated, and as will be more fully described in connection with the control system of FIG. 15, the switch device LS 573 is adapted to activate a timing relay which monitors the duration of the actual soldering operation.

SHEET LOCATORS AND ELEVATORS

Figure 7:
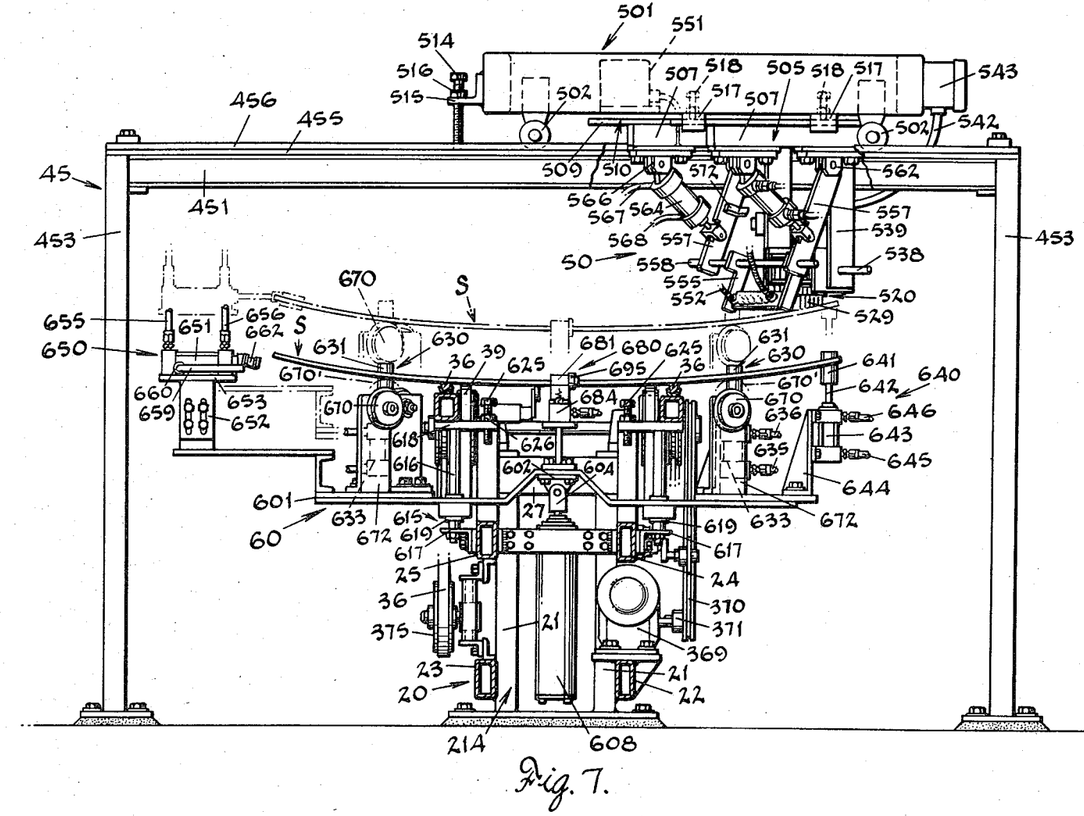
FIG. 7 is a transverse vertical sectional view taken on the plane of line 7—7 in FIG. 3.

At each soldering station means are provided for interrupting forward movement of a glass sheet, for accurately positioning the sheet in the proper attitude for the soldering operation, and for lifting the sheet to the elevation of the related soldering unit 50. This locator and elevator means, generally designated by the numeral 60 and best illustrated in FIGS. 3, 4, 7 and 8, includes a platform 601 which in its medial area has a bracket 602 that by rod 603 is connected to a clevis member 604. The clevis 604 is carried at the outer end of the rod 606 of a piston 607 contained in a cylinder actuator 608 that is mounted on a cross-member 609 structurally attached to the bars 24 and 25 of the framework 20 (FIGS. 7 and 8). The cylinder is put in communication with a source of pressure through conduits 611 and 612 connected to its head and rod ends.

The platform 601 is maintained in a definite vertically directed path of motion by guide-rod structures 615 that are arranged in equally spaced relation to the longitudinal axis of the framework 20. Each guide rod structure includes a pair of vertically disposed, longitudinally spaced rods 616 supported at their lower ends on a bracket 617, at their upper ends by a plate 618 and passing through bushings 619 in the body of the platform. The desired limit of upward platform movement is determined by a plurality of set-screws 625, threaded through the plates 618 and equipped with lock-nuts 626.

Also, the platform 601 (FIG. 6) carries locator devices 630 to interrupt forward movement of a sheet S, moving over the platform when it is in lowered position, and a positioning device 640 that interrupts transverse movement of the sheet as produced by a clamping device 650. A blocking device 680 is adapted to engage the trailing side of the sheet and thereby place the sheet in the proper attitude for the soldering operation by urging the leading side of the sheet into positive contact with the locator devices 630. In other words, as a sheet is conveyed forwardly by either of the pair of belts 33 or 36, it is anticipated that it may become slightly "skewed" with reference to the longitudinal axis of the apparatus. Thus, the sheet may be shifted with regard to said axis such that one end or the other of the leading side will be located more forwardly than the other, and it is the function of the devices just described to so locate the sheet above the platform 601 that a vertical plane through the transverse axis of the sheet will coincide with a vertical plane through the longitudinal axis of the apparatus.

Figure 6:
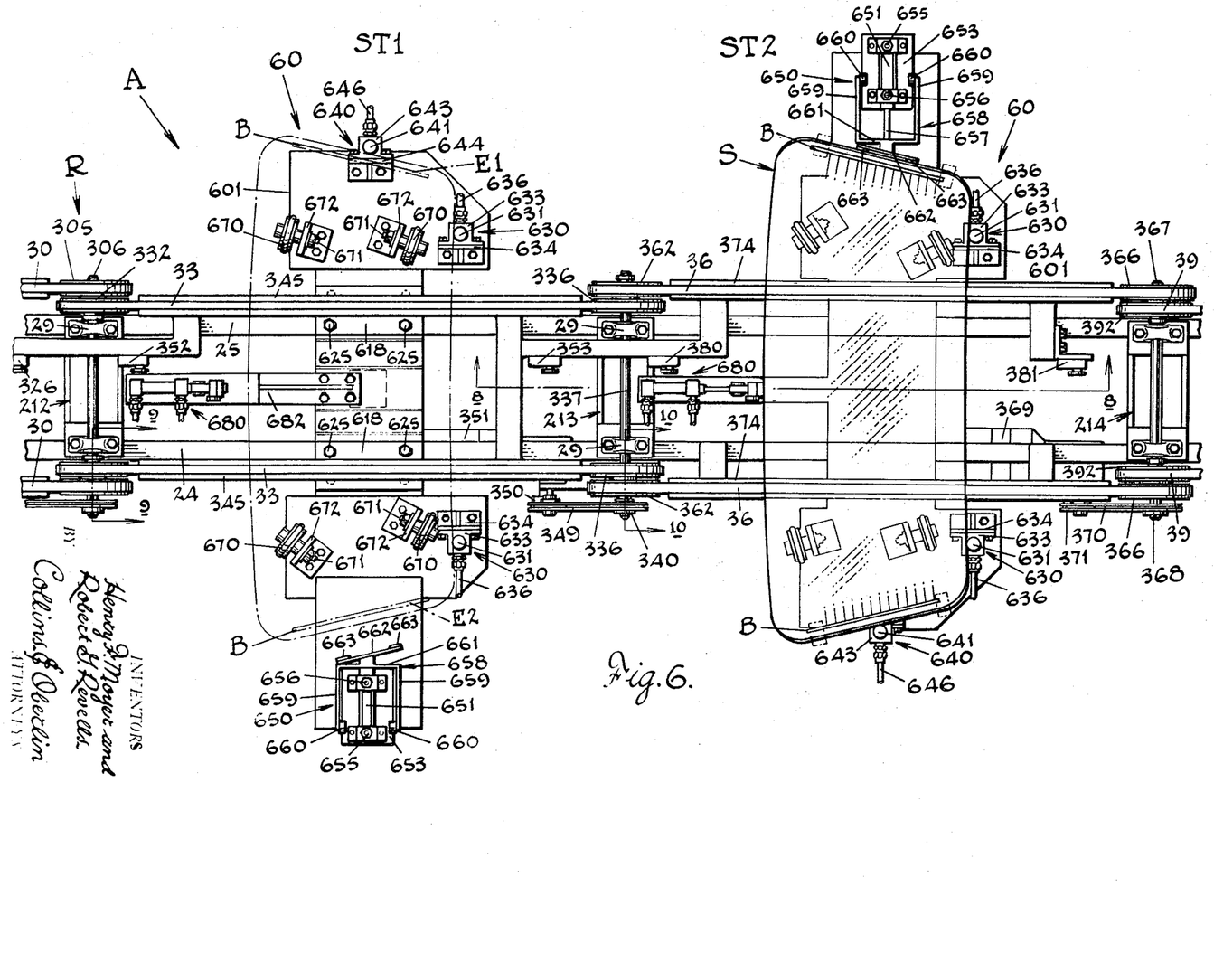
FIG. 6 is an enlarged fragmentary plan view of the apparatus as taken on the plane of line 6—6 in FIG. 3.

More specifically, as can be seen in FIGS. 6, 7 and 8, the locator devices 630 include annular plugs 631 of a non-abrasive material, such as plastic, carried on the end of the rod 632 of a piston contained in a cylinder actuator 633. Each cylinder is mounted by a bracket 634 on the platform 601 and preferably their head ends are connected in common to a source of pressure by conduits 635 which is also true with regard to the conduits 636 connecting to the rod ends. In this way the plugs 631 will be moved substantially simultaneously upwardly into position for engagement with a glass sheet and downwardly to permit said sheet to move thereover. As best seen in FIG. 6, the locator devices 630 are located in equally spaced relation to the longitudinal axis of the apparatus and also with a vertically disposed plane through the axes of the plugs being arranged at substantially a right angle to said longitudinal axis.

The positioning device 640 and clamping device 650 are intended to produce transverse shifting of the sheet when necessary to its proper positioning and, to this end, the device 640 is located to engage one side of a moving sheet while the clamping device 650 is adapted to be brought into contact with the opposite end of the sheet to locate accurately the transverse axis thereof in the aforementioned vertical plane through the longitudinal axis of the apparatus. Thus, the locator device 640 is positioned on platform 601 at the correct distance from said longitudinal axis and has an annular plug 641, as of a plastic material, that is carried on the rod 642 of a piston contained in the cylinder actuator 643. The cylinder is supported on the platform by a bracket 644 and is connected to a source of pressure at its head and rod ends by conduits 645 and 646.

The clamping device 650 (FIGS. 6 and 7) includes a cylinder actuator 651 supported by a vertically adjustable bracket 652 on the platform 601 and having a mounting plate 653. The cylinder is connected to a source of pressure by way of conduits 655 and 656 connecting to the head and rod ends thereof. The piston rod 657 carries a U-shaped member 658 at its outer end, the legs 659 of said member being equipped with small wheels 660 adapted to traverse the mounting plate 653. The web 661 of the member 658 carries a clamping plate 662 with layers of non-abrasive material 663 at either end. As viewed in FIG. 7, retraction of the rod 657 causes outward movement of the clamping plate 662, as shown in full line, to a rest position wherein it will not interfere with movement of a glass sheet. Similarly, upon projection of the rod 657, the layers 663 of the plate 662 will be moved into contact with one side of the sheet to urge the opposite side against and in proper relation to the plug 641 of the positioning device 640 if said side is not already in that position.

Relatively free movement of a sheet, when lifted from a pair of conveyor belts by a platform 601, is achieved by the provision of ball-bearing, rubber-tired wheels 670 having stub axles 671 by which the wheels are supported by brackets 672 on the platform. As shown in FIG. 6, the brackets 672 can be secured to the platform in a variety of angular positions to locate the wheels for most efficient supporting of a sheet as it is moved transversely or secured against the positioning device 640 by the clamping device 650.

The interrelated action of the clamping device 650 with upward movement of the platform 601 is best explained by consideration of FIG. 7 wherein a sheet S is represented in full line while it is supported on the pair of conveyor belts 36 and the leading side is engaged by the plugs 631 of the locating devices 630. Now, as upward movement of the platform is initiated, the several wheels 670 will be raised to positions, such as at 670', to lift the sheet from the pair of belts and allow freedom of shifting movement of the sheet by the clamping device 650 as the platform continues to be moved upwardly until the sheet reaches an elevation such as the one indicated in broken line. This elevation can be predetermined by movement of the platform into contact with the several set screws 625.

Cooperatively acting with the clamping device 650, the blocking device 680 has a contacting member or block 681 that is operated to firmly position the sheet against the locator plugs 631 and between the positioning plug 641 and the plate 662 of the clamping device 650. As best seen in FIGS. 6, 8 and 11, the device 680 is bodily mounted on a bracket 682 that is carried by the platform 601 and has an upper plate 683. This plate supports a cylinder actuator 684 having connection to a source of pressure through conduits 686 and 687 at its head and rod ends. The rod 688 of a piston contained in the cylinder is attached at its outer end to a carriage 689 equipped with casters 690 which are adapted to support the carriage for movement along a substantially horizontal plane as they are caused to traverse the plate 683.

The contacting member 681 has a yoke-shaped lower end supported on the carriage by an axle 691 and with the web 692 acting to maintain the member in a substantially vertical position into which it is urged by a coil spring 693. The upper end of the member 681 carries a roller 695 on pin 696. The purpose of the roller 695, as viewed in FIG. 11, is to cause the member 681 to be swung downwardly from the full line upstanding position to the broken line position. This permits a sheet to be freely conveyed thereover as it enters the soldering area of station ST1, or station ST2, and is accomplished when the roller is engaged by the leading side LS of the sheet, as shown in full line. As the member is swung downwardly, the roller traverses the undersurface of the sheet until the trailing side TS has moved to a position as indicated when it is intended that the leading side LS will have engaged the locator plugs 631. The coil spring 693 causes return of the contacting member 681 to the vertical position and, as the platform 601 is raised to lift the glass sheet, pressure is directed by conduit 686 to the head end of the cylinder 684. Upon projection of the piston rod 688, the carriage 689 is advanced to bring the member 681 into contact, as shown in broken line, with the trailing side TS of the sheet thereby "blocking" said sheet firmly in desired position for the soldering operation by the associated soldering unit 50.

As will hereinafter be more fully explained in connection with the wiring diagrams, upon completion of the soldering operation, the platform 601 will be lowered with the plate 662 of the clamping device 650 and the carriage 689 of the blocking device 680 being retracted to release the sheet. The plugs 631 and 641 are then lowered before the motor for the belts 33 at the station ST1, or belts 36 at the station ST2, is started to cause the next forward movement of the sheet.

Figure 14:
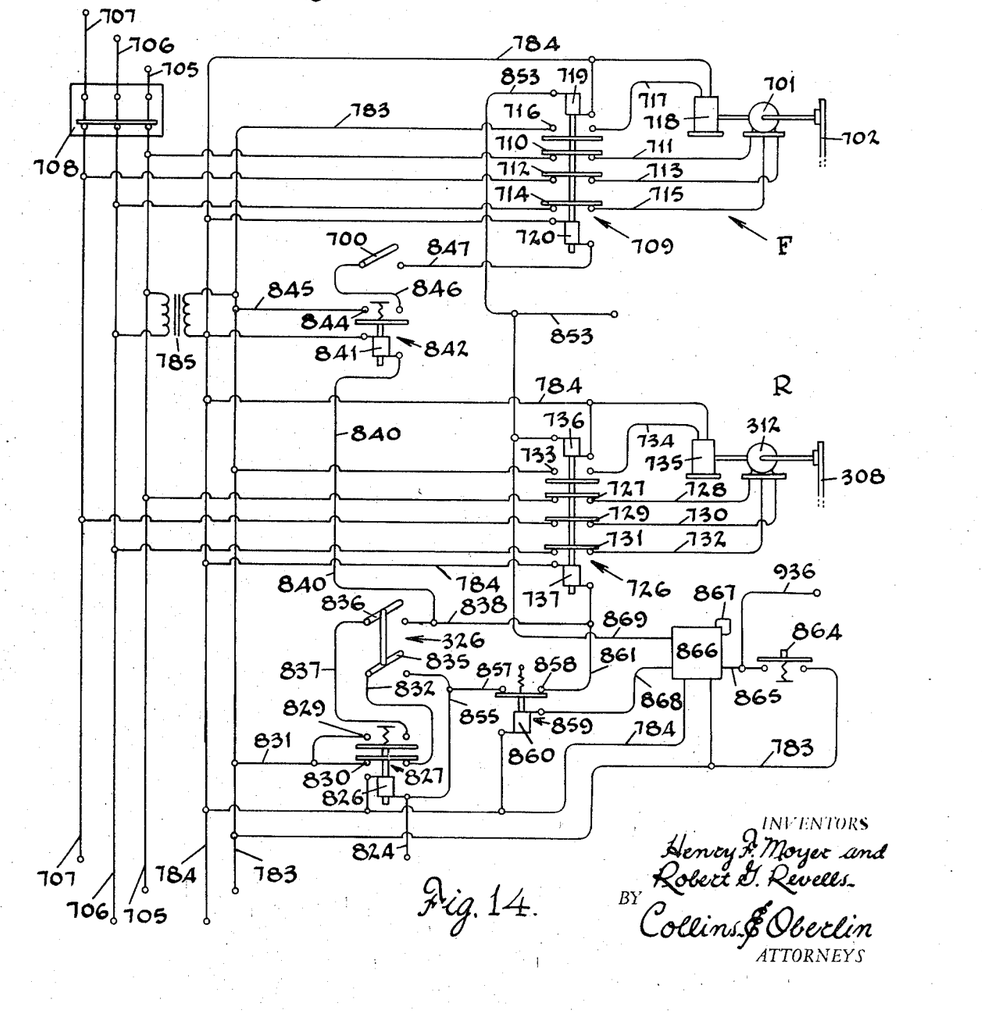
FIGS. 14, 15 and 16 are diagrammatic views of an electrical control system therefor.
Figure 15:
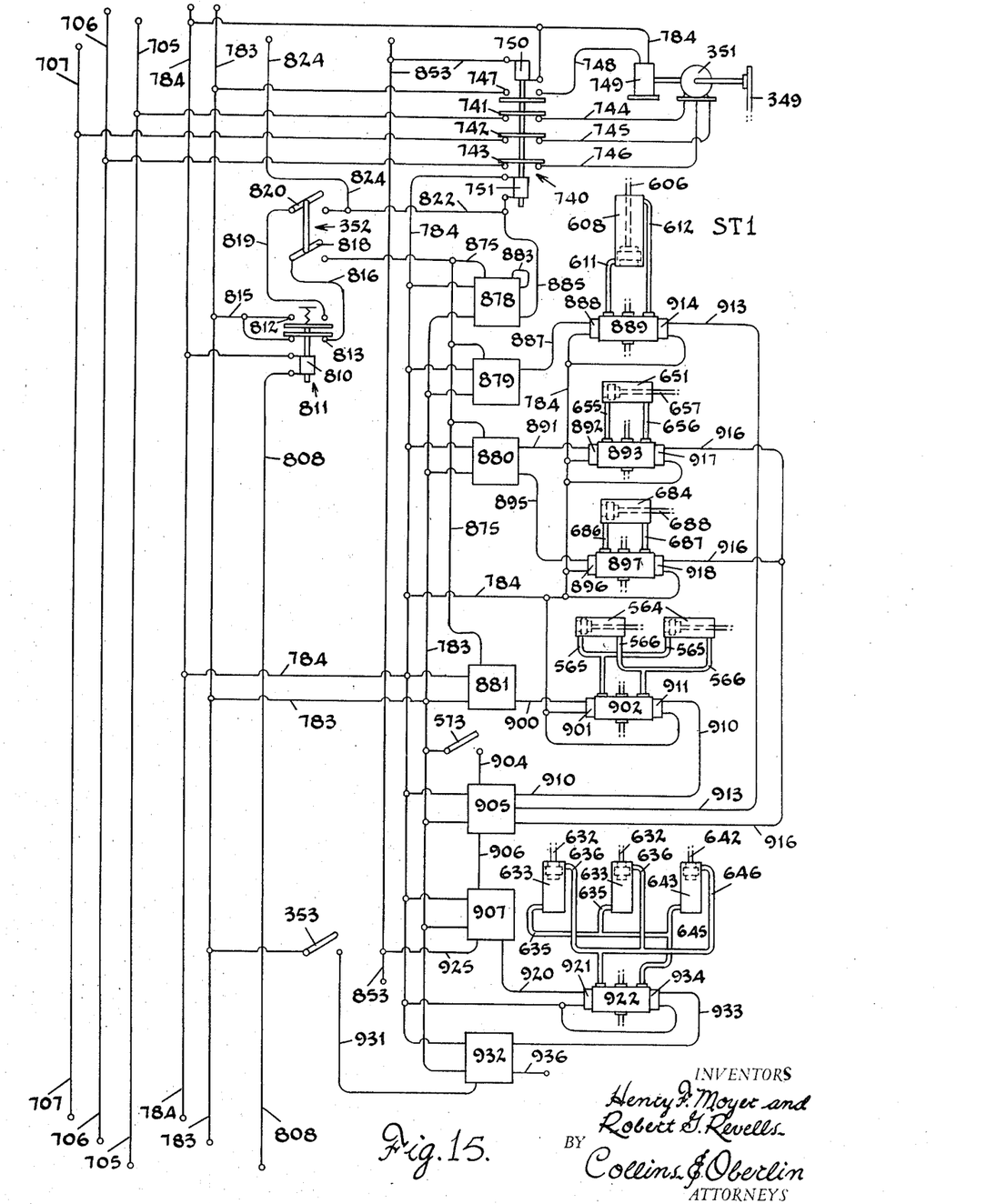
Figure 16:
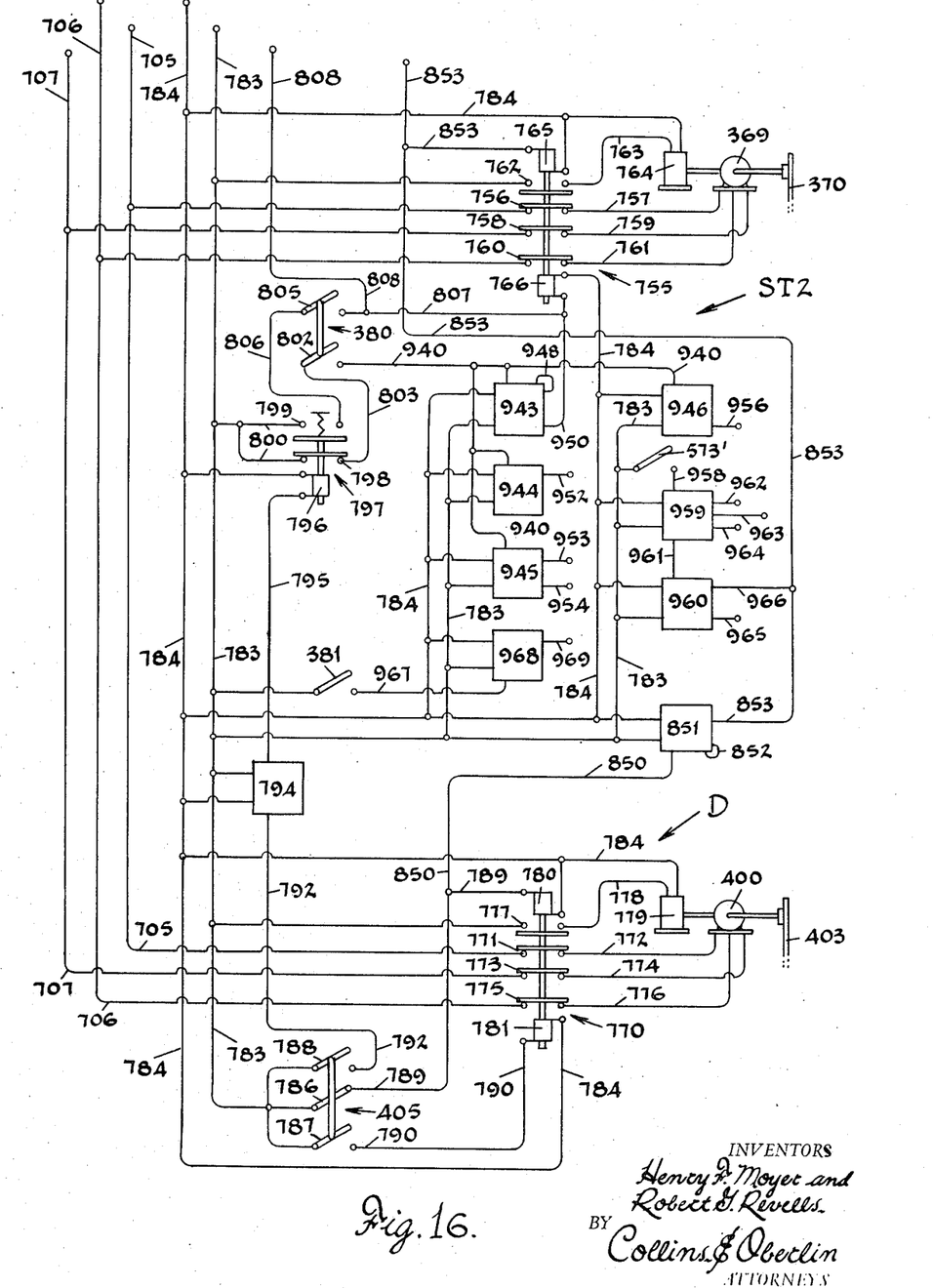

Turning now to these electrical diagrams, which are illustrated in FIGS. 14, 15 and 16, they include devices LS 326, LS 352, LS 353, LS 380, LS 381 and LS 405, all of which are operable by the glass sheets moving into and through the apparatus, and which control interrelatedly the operation of the motors 312, 251, 369 and 400. The relative location of these switches can best be seen in FIGS. 4 and 6 and the locations of drive connections from the motors in FIG. 3. Additionally, there is provided a switch device LS 700 for control of the operation of motor 701 for driving the conveyor belts of the feeder conveyor F (FIG. 14).

Generally stated, operation of the motor 351, is halted after LS 352 has been tripped by a glass sheet entering the first soldering station ST1. Closure of LS 352 should then be followed by closure of LS 326 to make effective the halting of motor 312 and thereby interrupt movement of a following sheet at a point adjacent the exit end of the receiving station R. This will in turn act to make LS 700 effective to halt movement of a sheet adjacent the exit end of the feeder conveyor F as operation of the motor 701 ceases. Upon completion of the first soldering operation, the motor 351 is restarted to advance the sheet to the second soldering station ST2 during which movement the sheet will trip LS 353. Among other functions to later be explained, LS 353 is employed to cause raising of the plugs of the locator and positioning devices 630 and 640, respectively, preparatory to advance of a following sheet from the receiving station R to the soldering station ST1 where, in due course, LS 352 is again tripped. When the said following sheet is removed from the receiving station, the sheet on the feeder conveyor F can be advanced to the entry end of the receiving station after starting of the motor 701.

In these spaced sequences of movement of a series of glass sheets, that one entering station ST2 will trip LS 380 to eventually halt the motor 369 as the following sheet is intended to substantially simultaneously trip LS 352 in the station ST1. After completion of the second soldering operation and starting of the motor 369, the "lead" sheet is advanced toward the discharge station D and trips LS 381. As in the case of LS 353, LS 381 acts to cause upward movement of the plugs of the locating and positioning devices 630 and 640, respectively, before the following sheet is advanced from station ST1. Upon being advanced to a point adjacent the exit end of the discharge station D, the "lead" sheet trips LS 405 to cause halting of the associated motor 400. Now, if this sheet is inadvertently left on the conveyor belts 39 and LS 405 is held closed, it is contemplated that motors 369, 351, 312 and 701 will be rendered idle, in sequence, to halt further movement of the several following glass sheets.

More particularly, source lines 705, 706 and 707 are connected from a panel switch 708 through a relay switch RS 709 to the motor 701 to drive chain belt 702. For this purpose, RS 709 (FIG. 14) has engaged contact pair 710 connecting source line 705 to the motor by way of line 711; engaged contact pair 712 connecting source line 706 to the motor by line 713; engaged contact pair 714 connecting service line 707 by line 715; disengaged contact pair 716 connecting by line 717 to motor brake 718; and opposed solenoids 719 and 720. Motor 312 (FIG. 14) is connected to the source lines in substantially the same manner through relay switch RS 726. This relay switch has engaged contact pair 727 connecting source line 705 to the motor 312 by line 728; engaged contact pair 729 connecting source line 706 and 730; engaged contact pair 731 connecting source line 707 by line 732; disengaged contact pair 733 connecting by line 734 to the motor brake 735, and opposed solenoids 736 and 737.

A relay switch RS 740 (FIG. 15) has engaged contact pairs 741, 742 and 743 which connect source lines 705, 706 and 707 to the motor 351 by way of lines 744, 745 and 746, respectively; RS 740 having disengaged contact pair 747 connecting by line 748 to motor brake 749 and opposed solenoids 750 and 751. Similarly, relay switch RS 755 (FIG. 16) connects the source lines to motor 369 through engaged contact pair 756 and line 757; engaged contact pair 758 and line 759; engaged contact pair 760 and line 761; RS 755 also having disengaged contact pair 762 connecting by line 763 to motor brake 764 and being equipped with opposed solenoids 765 and 766. Operation of the motor 400 for the belts 39 of the discharge station D is controlled by a relay switch RS 770 (FIG. 16) with engaged contact pair 771 connecting source line 705 to the motor by line 772; engaged contact pair 773 connecting source line 706 by line 774 and engaged contact pair 775 connecting source line 707 to the motor by way of line 776; RS 750 having disengaged contact pair 777 connected by line 778 to motor brake 779 and opposed solenoids 780 and 781.

OPERATION

When a first glass sheet S, with assembled bus bars B clamped thereto, is removed from the assembly table T and placed on the conveyor belts of the feeder conveyor F, operation of the motor 701 will advance the sheet toward the exit end thereof which will result in tripping of LS 700. At this time, a circuit trough LS 700 will be ineffectual to halt operation of the motor 701 and forward movement of the sheet onto the belts 30 of the receiving station R will continue until the first sheet trips LS 326 to produce halting of the motor 312. Nevertheless, by means to be hereinafter described, operation of the motor is resumed and the sheet will move forward, tripping LS 352, until it is halted by the locator plugs 631 in the first soldering station ST1. LS 352 acts to produce halting of motor 351, it then causes halting of motor 312 upon closure of LS 326 in the event a following sheet has reached the receiving station R, and it then initiates the first soldering operation.

To accomplish this, circuits for the several switch devices and the electric components affected thereby are made by way of service lines 783 and 784 connected to the secondary side of a transformer 785, the primary side of which is in circuit with source lines 705 and 706. Since, as aforementioned, when a glass sheet reaches a point adjacent the exit end of the discharge station D and is not removed from the pair of belts 39, LS 405 will remain closed. LS 405 has three switch contact components, contact side CS 786 which is intended to normally be closed, normally open contact side CS 787 and an open contact side CS 788. Thus, while CS 786 is closed, the circuit of a line 789 is maintain to solenoid 780 of RS 770 and the motor 400 will continue to operate. On the other hand, when CS 786 opens as CS 787 is closed, the circuit of a line 790 is completed through the opposed solenoid 781 of RS 770 to service line 784. This acts to disengage contact pairs 771, 773 and 775 to open the circuits from source lines 705, 706, and 707 to motor 405 and engage contact pair 777 to complete the circuit via line 778 through the motor brake 779.

Also when CS 788 is simultaneously closed, it makes a circuit from service line 783 by line 792 to a timing relay TR 794, in series with service lines 783 and 784. TR 794 monitors an interval of time sufficient for the sheet to be removed from the belts 39 which will release LS 405 with resulting reengagement of CS 786 to cause restarting of the motor 400 upon completion of line 789. Disengagement of CS 787 and particularly CS 788 will open the circuit of line 792 whereupon TR 794 will cease to function.

On the other hand, if TR 794 is maintained active until expiration of the time interval, it is adapted to complete a circuit by line 795 through the solenoid 796 of a spring-biased relay switch SRS797 to service line 784. SRS 797 has contact pairs 798 and 799, each being connected at one end to service line 783 by line 800. Contact pair 798 is normally engaged to connect line 800 to one end of contact side CS 802 of LS 380 by line 803. When solenoid 796 is energized, contact pair 798 is disengaged and contact pair 799 engaged to complete a circuit from line 800 to one end of contact side 805 of LS 380 by way of line 806.

Now when a sheet is being advanced from the pair of belts 33 in the first soldering station ST1, it is received on the conveyor belts 36 in the entry end of the second soldering station and trips LS 380. Since solenoid 796 of SRS 797 is energized, contact pair 798 will be disengaged to open line 803 to CS 802 and contact pair 799 engaged to complete lines 800–806 to CS 805. Thus, before LS 380 is released by the trailing side of the sheet, CS 805 is adapted to complete the circuit of a line 807 through the solenoid 766 of RS 755 to service line 784. This operates to disengage contact pairs 756, 758 and 760 to halt operation of the motor 369 upon opening of lines 757, 759 and 761 while engaged contact pair 762 completes lines 763 to energize the brake 764. CS 805 additionally completes the circuit of line 808 through the solenoid 810 of a spring-biased relay switch SRS 811 to service line 784; SRS 811 having contact pairs 812 and 813. This will result in disengagement of contact pair 813. This will result in disengagement of contact pair 813 to open the circuit of lines 815–819 to one end of contact side CS 820.

Accordingly, when a sheet is received on the conveyor belts 33 of the first soldering station ST1, it trips LS 352 to close CS 818 and CS 820; the circuit of line 816 to one end of CS 818 being open. Closure of CS 820, before the trailing end of the sheet releases LS 352, creates a circuit by line 822 through the solenoid 751 of RS 740 to service line 784. Contact pairs 741, 742 and 743 will thereby be disengaged to open lines 744, 745 and 746 to the motor 351 while engaged contact pair 747 will make the circuit of line 748 through the motor brake 749. CS 820 also extends the circuit of line 822 by branch line 824 through the solenoid 826 of a spring-biased relay switch SRS 827 to service line 784. SRS 827 has pairs of contacts 829 and 830 with the pair 830, while engaged, making a circuit from service line 783, lines 831 and 832 to one end of contact side CS 835 of LS 326. LS 326 has another contact side CS 836 connected at one end by line 837 to one end of contact pair 829. Now when solenoid 826 is engaged, contact pair 830 will be disengaged to open the circuit of lines 831–832 while engagement of contact pair 829 will complete a circuit by lines 831 and 837 to CS 836. Thus, when LS 326 is tripped by a glass sheet received on the belts 30 and approaching the exit end of the receiving station R, CS 835 and CS 836 will be closed. Since the circuit of line 832 is open to one end of CS 835, the ensuing closure will be without effect. However, closure of CS 836 will complete the circuit of line 837 via line 838 through solenoid 737 of RS 726 to service line 784 which will result in halting of the motor 312. Additionally, the circuit of line 837 is continued by line 840 through the solenoid 841 of a spring-biased relay switch SRS 842 to service line 784; SRS 842 having a pair of contacts 844 which when engaged connect to service line 783 by line 845 to line 846. Thus, when a sheet approaches the exit end of the feeder conveyor F, it trips LS 700 to complete a circuit by lines 846 and 847 through the solenoid 720 of RS 709 to service line 784. While solenoid 720 is energized, contact pairs 710, 712 and 714 will be disengaged to open the circuits of source lines 705, 706 and 707 to the motor 701 and engaged contact pair 716 will complete line 717 through the motor brake 718 to service line 784.

It is of course realized that upon removal of a sheet from the belts 39 in the discharge station D, LS 405 will be released and CS 787 will be opened to break the circuit of line 790. CS 786 will again be engaged to complete the circuit of line 789 from service line 783 through the solenoid 780 of RS 770 to service line 784. In order to restore operation of the motors 369, 351, 312 and 701, branch line 850 from line 789 is connected to a timing relay TR 851, in series with service lines 783 and 784, by way of line 852. TR 851 initially opens the circuit of lines 850-852 and then completes a circuit by way of line 853 which is extended through the solenoid 765 of RS 755, the solenoid 750 of RS 740, the solenoid 736 of RS 726 and solenoid 719 of RS 709 to start the associated motors. Also, when CS 788 of LS 400 is opened, the circuit of line 792 will be broken to TR 794. Consequently, control of the motors will again be individually controlled by their respective switch devices. This will result in continued operation of the motor 701 to advance a glass sheet from the feeder conveyor F onto the entry end of the receiving station R.

Now with solenoid 826 deenergized and when the sheet trips LS 326, the circuit of lines 831-832 through contact pair 830 of SRS 827 to CS 835 will complete a circuit by line 855 through the solenoid 826 of SRS 827 to service line 784 thereby to bring about disengagement of contact pair 830, engagement of contact pair 829 and connection of line 831 to CS 836 by line 837. Closure of CS 836 will make the circuit of lines 838 and 840 to energize solenoid 841 of SRS 842 and engage contact pair 844 to complete the circuit of lines 845-846 to one end of LS 700. Thus, when a following sheet trips LS 700, it will complete a circuit by lines 846 and 847 through the solenoid 720 of RS 709. This will disengage contact pairs 710, 712, and 714 to open the circuits of source lines 705, 706 and 707 while engaged contact pair 716 will complete the circuit of line 717 from service line 783 to the brake 718 to halt the motor 701.

Substantially simultaneously, branch line 857 from line 855 will complete a circuit through the engaged contact pair 858 of a spring-biased relay switch STS 859, having solenoid 860, and line 861 through the solenoid 737 of RS 726. This will disengage contact pairs 727, 729 and 731 to open the circuit of source lines 705, 706 and 707 to the motor 312 while engaged contact pair 733 will complete a circuit from service line 783 and line 734 through the motor brake 735.

In the event that this sheet on LS 326 is a first or "lead" sheet, resumption of operation of the motor 312 to advance the sheet into station ST1 can be obtained by temporary use of a manual switch MS 864 to make a circuit from service line 783 and line 865 to a timing relay TR 866, in series with service lines 783 and 784. TR 866 is activated by way of line 867; first acting to open the circuit of lines 865-867 and then establish a circuit by line 868 through the solenoid 860 of SRS 859 to disengage the contact pair 858 and break the circuit of lines 757-861. TR 866 then completes a circuit by lines 869 and 853 through the solenoid 736 of RS 726 to service line 784 thereby disengaging contact pair 733 and re-engaging contact pairs 727, 729 and 731 to connect source lines 705, 706 and 707 to the motor 312 via lines 728, 730 and 732. Also by the connection with line 853, a circuit is made through solenoid 719 of RS 709 to service line 784 and, since the opposed solenoid 720 has been de-energized upon opening of LS 700, will be effective to disengage contact pair 716 while engaging contact pairs 710, 712 and 714 to start the motor 701.

Upon entering the area of the first soldering station ST1, the sheet trips LS 352, as illustrated in FIG. 15. While LS 352 is held closed by the advancing glass sheet, the circuit of lines 815-816 through contact pair 813 of SRS 811, and closed CS 818 of LS 352 will establish a circuit by line 875 which is adapted to activate a series of timing relays TR 878, TR 879, TR 880 and TR 881; all being in series with service lines 783 and 784. TR 878 is activated by line 883 and initially acts to open the circuit of lines 875 and 883. TR 878 is intended to monitor an interval of time after the leading side of the sheet has tripped LS 352 and until said leading side is brought into contact with the plugs 631 of locator devices 630. The circuit of a line 885 is then made through solenoid 751 of RS 740 to service line 784 thereby to open the circuits of source lines 705, 706 and 707 to motor 351 upon disengagement of related contact pairs 741, 742 and 743. Engagement of contact pair 747 then completes a circuit from service line 783 and line 748 to energize the brake 749 and halt motor 351.

The timing of TR 879 is adjusted to allow the belts 33 and a sheet carried thereby to come to a rest position and then make a circuit by line 887 through the end 888 of a valve 889 connected to a suitable source of pressure. By way of conduit 611, pressure is thus applied at the head end of cylinder actuator 608 to raise the contained piston and associated rod 606 and lift the elevator platform 601. As indicated in FIG. 7, the several wheels 670 on the platform are carried upwardly to an elevation, as at 670', and then conjointly lift the sheet from the conveyor belts 33 to the upper limit of movement of the platform where the sheet will then be located at an elevation as indicated in broken line.

TR 880 is adjusted for a slightly longer interval of time, after the sheet is lifted from the conveyor belts 33 by the wheels 670, and to then first make a circuit by tine 891 through the end 892 of valve 893 to service line 784. The valve 893 directs pressure by conduit 655 to the head end of the cylinder 651 to project the piston rod 657, bring the plate 662 against the adjacent side of the sheet and push the opposite side of the sheet firmly against the plug 641 of the positioning device 640. By line 895, TR 880 then completes a circuit through the end 896 of a valve 897 to apply pressure through conduit 686 to the head end of cylinder 684. By piston rod 688, the carriage 689 of blocking device 680 is thus advanced to position the member 681 firmly against the trailing side TS of the sheet, as shown in the upper broken-line position of FIG. 11.

Now, when the sheet is so located with the bus bar B affixed by clamps to the electrode E1, the heated condition of the several soldering tips 529 produces early preheating of the body of the bus bar. A desired interval of time for this purpose is monitored by TR 881 which then makes a circuit by line 900 through the end 901 of a valve 902 connected to the head ends of the pair of cylinder actuators 561 by conduits 565. This causes swinging of the arms 557 to locate the feed devices 553 and projecting lengths of solder wire 550 in the desired position with reference to the soldering tips 529 and bus bar, as indicated in broken line in FIG. 12. As one of the arms 557 is swung forwardly, the actuator 572 trips LS 573 to complete a circuit from service line 783 by line 904 and activate timing relay TR 905 which then monitors the desired timed interval for the actual soldering action to be carried out.

TR 905, in series with service lines 783 and 784, first creates a circuit by line 906 to an associated timing relay TR 907 and then by line 910 completes a circuit through the end 911 of the valve 902 to swing the arms 557 rearwardly and the devices 553 to the rest position, as shown in full line in FIG. 12. By way of a second circuit, a line 913 is extended through the end 914 of valve 889 to service line 784. This will direct pressure by conduit 612 to the rod end of cylinder 608 to retract the rod 606 thereby lowering the platform 601 and glass sheet thereon.

A third circuit by line 916 from TR 905 is made jointly through the end 917 of valve 893 and end 918 of valve 897 to service line 784. In the first instance, pressure by way of conduit 656 to the rod end of cylinder 651 serves to retract the plate 662 while, in the second instance, the application of pressure through conduit 687 to the cylinder 684 will retract the rod 688 and mainly the member 681 from engagement with the trailing side of the sheet.

Activity of TR 907 is realized in the completion of a line 920 through the end 921 of a valve 922 which by conduits 636 and 646 to the cylinders 633 and 643, respectively, jointly produces lowering of the plugs 631 of locator devices 630 and the plug 641 of positioning device 640 to positions beneath the undersurface of the glass sheet. TR 907 then completes a circuit by line 925 through line 853 to restart the motor 351. To this end, the circuit of lines 853 and 925 is made through the solenoid 750 of RS 740 to disengage contact pair 747 and engage contact pairs 741, 742 and 743 to reconnect source lines 705, 706 and 707 to the motor 351 by way of lines 744, 745 and 746.

As the leading side of the glass sheet approaches the exit area of station ST1, it trips LS 353 to complete a circuit from service line 783 to line 931 to activate a timing relay TR 932, in series with service lines 783 and 784. TR 932 monitors an interval if time after the trailing side of the sheet releases LS 353 and then completes a circuit by line 933 through the end 934 of valve 922. This will direct pressure jointly through conduits 635 and 645 to the head ends of cylinders 633 and 643, respectively, to bring about raising of the locator plugs 631 and positioning plug 641 in preparation for the arrival of a following glass sheet into the first soldering station ST1. TR 932 next completes a circuit by lines 865 and 936 to TR 866 to thus activate the same. As aforementioned, TR 866 by line 868 energizes solenoid 858 to disengage contact pair 856 of SRS 857 and then by line 869 through line 853 energizes solenoid 736 of RS 726 to essentially engage contact pairs 727, 729 and 731 to start operation of the motor 312.

As the sheet in the receiving station R is advanced from the conveyor belts 30 onto the pair of belts 33 in the first soldering station, it releases LS 326 thereby opening CS 835 to break the circuitry of lines 832, 855 and 857. This acts to de-energize the solenoid 826 of SRS 827 to also break the circuit of line 831–837 to CS 836 which has opened with CS 835. Since the solenoid 841 of SRS 842 is now de-energized to disengage contact pair 844, the circuit of line 845 to line 846 and LS 700 is open and, if LS 700 has not been tripped by a following glass sheet on the feeder conveyor F, line 847 will be ineffective to continue energization of solenoid 720 of RS 709. Consequently, when the circuit of lines 853–869 energizes the opposed solenoid 719 of RS 709, contact pair 716 will be disengaged while contact pairs 710, 712 and 714 will connect source lines 705, 706 and 707 to the motor 701 by way of lines 711, 713 and 715.

The sheet advancing onto the belts 36 for the second soldering station ST2 will trip LS 380, illustrated in FIG. 16. Closed contact pair 798 of SRS 797 complete the circuit of lines 800–803 from service line 873 to closed CS 802. While LS 380 is held closed, CS 802 completes the line 940 which serves to activate the series of timing relays TR 943, TR 944, TR 945 and TR 946; all of these relays being in series with service lines 783 and 784. TR 943 is activated by line 948 and first functions to open the circuit of lines 940–948. TR 943 monitors the interval of time for continued operation of the motor 369 after the leading side has advanced into contact with the plugs 631 of the locator devices 630 associated with the locator and elevator means 60 in the second soldering station ST2. TR 943 then establishes the circuit of a line 950 through the solenoid 766 of RS 755 to service line 784. This will disengage contact pairs 756, 758 and 760 to disconnect source lines 705, 706 and 707 and lines 757, 759 and 761 to the motor 369 while engaged contact pair 762 will make the circuit of lines 763 from service line 784 through motor brake 764 to service line 784.

The timing cycle of TR 944 is adjusted for a sufficient interval of time to allow the pair of belts 36 and sheet thereon to come to a rest position and to then complete a circuit by line 952. To reduce duplication of description relative to the cylinder 608 for raising and lowering the platform 601 in the second soldering station ST2, it is here indicated that the circuit of line 952 produces the operation of a valve in substantially the same manner and for the same purpose as line 887 from TR 879 to valve 889 in FIG. 15. This is also true with regard to TR 945 which by line 953 operates a valve, as the valve 893 of FIG. 15, to cause forward movement of the plate 662 to urge the sheet against the plug 641 of the positioning device 940 in the second soldering station. Similarly, TR 945 by line 954 is employed to operate a valve to move the blocking member 681 of the device 680 of the second soldering station into engagement with the trailing side of the sheet.

TR 946 makes a circuit by line 956 to a valve which operates the cylinder actuators to swing the arms 557 of the second soldering unit 50. Now, when LS 573' is closed, line 958 is completed to timing relay TR 959 which first activates timing relay TR 960 by way of line 961; both TR 959 and TR 960 being in series with service lines 783 and 784. By way of line 962, TR 959 makes a first circuit to cause rearward swinging movement of the arms 557; line 963 to produce lowering of the elevator platform and by line 964, rearward movements of the clamping plate and blocking member.

When the sheet has been lowered onto the pair of belts 36, TR 960 becomes active to first establish the circuit of a line 965 to a suitable valve, such as the valve 922 in FIG. 15, to produce downward movement of the plugs associated with the locator devices 630 and positioning device 640 in the second soldering station. Secondly, TR 960 establishes a circuit by line 966 through the solenoid 765 of RS 755 to service line 784. This serves to disengage contact pair 762 to de-energize motor brake 764 and engage contact pair 756, 758 and 760 with resulting operation of the motor 369.

AS the sheet S, with both bus bars B having been attached by soldering to the electrodes E, is removed from the area of station ST2, the leading side causes tripping of LS 381 whereby a circuit by line 967 is completed to timing relay TR 968, in series with service lines 783 and 784. TR 968 is adapted to monitor an interval of time after LS 381 is released by the trailing side of the sheet as it is moved onto the conveyor belts 39 of the discharge station D. Thereafter, TR 968 establishes a circuit by line 969 to a valve which, as in the case of valve 922 of FIG. 15, produces upward movement of the plugs of the locator devices and positioning device preparatory to the entrance of a following glass sheet into the second soldering station.

As the sheet approaches the exit end of the discharge station, LS 405 is tripped whereby CS 787 will be closed to complete line 790 through the solenoid 781 of RS 770 to service line 784. This causes halting of the motor 400 as previously described. CS 788 of LS 405 is substantially simultaneously closed to connect to TR 794 through line 792. In the event that the sheet is removed from the belts 39 before TR 794 "times" out, the circuit of line 797 will not be made and movement of glass sheets from the feeder conveyor F, the receiving station R, first and second soldering stations ST1 and ST2, respectively, will not be interrupted.

MODIFIED FORM

Figures 17, 18:
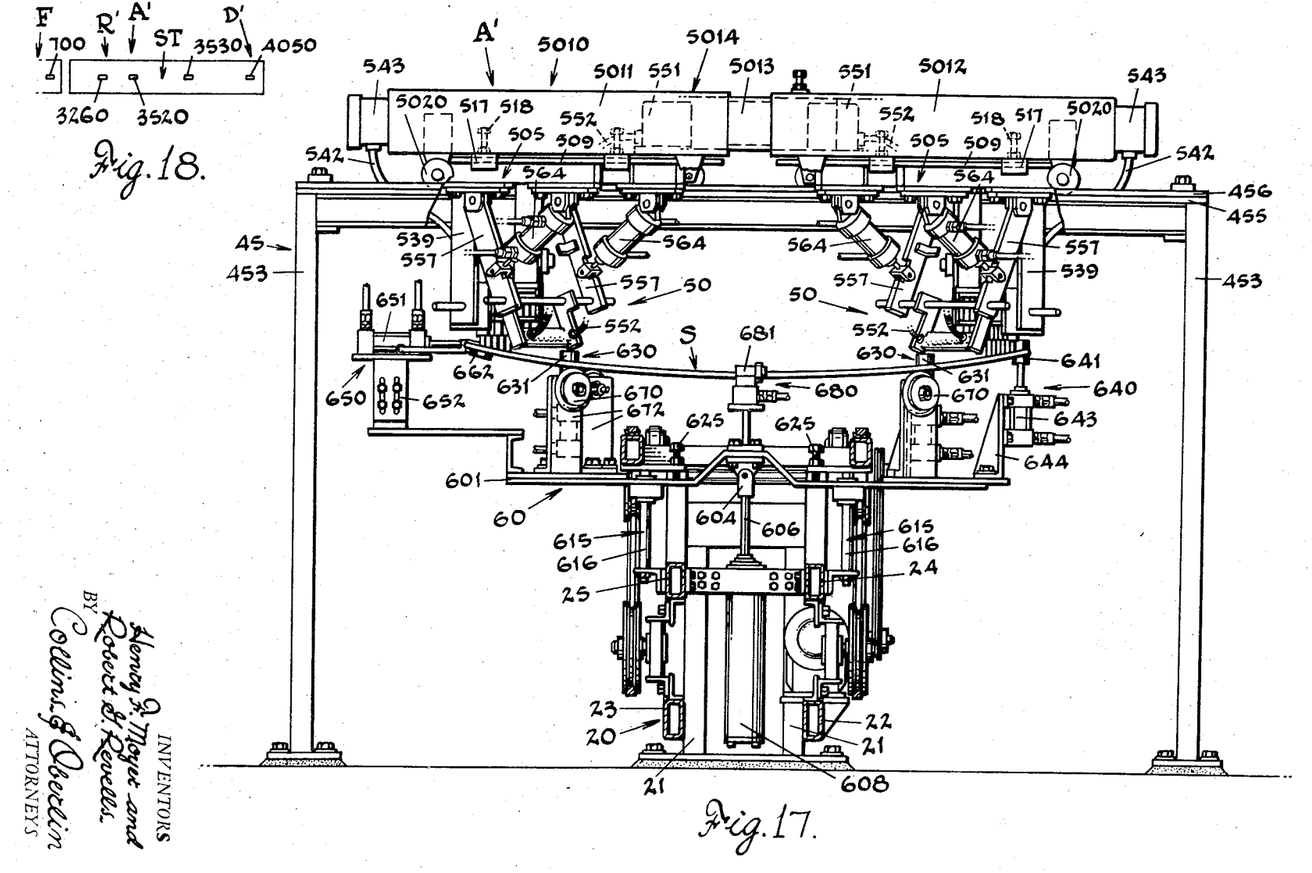
FIG. 17 is a transverse vertical view through a modified embodiment of the soldering apparatus.
FIG. 18 is a diagrammatic view of a control system for the apparatus of FIG. 17.

In FIG. 17 there is illustrated a modified form of the apparatus specifically described above, and which is adapted to convey a glass sheet into position for a pair of bus bars to be soldered thereon at the same time by oppositely disposed soldering units. This modified apparatus A' also makes it possible, by suitable orientation of the soldering irons, to affix the bus bars to electrodes arranged along the longer sides of the sheet and with the fine metal lines of the heating grid parallel with the transverse axis of the sheet.

The soldering units 50 of the apparatus A' are supported by a carriage 5010 on a structural framework 45 having horizontally disposed beams on which the plates 455 and guide rails or tracks 456 are attached. The carriage 5010 is intended to support two of the soldering units 50 in such manner that they can be readily adjusted to differently spaced positions from the longitudinal axis of the framework 20. By way of example, the carriage can be formed by a pair of component members 5011 and 5012 interjoined by spacer members 5013 and providing a telescopic frame 5014 for the carriage 5010. The members 5011 and 5012 have casters 5020 that are adapted to move in the track between the rails 456.

In operation, the modified apparatus A' functions automatically in the same manner as the apparatus A by means of switch devices located as shown diagrammatically in FIG. 18. Thus, a sheet entering the receiving station R' will trip LS 3260 to halt further movement in the event that a "lead" sheet has, in advancing into the soldering station, tripped LS 3520 and then halted in contact with the locator devices 630. As described in connection with the diagram of FIG. 15, the cylinder 608 is then caused to raise the platform 601; the cylinder 651 is caused to advance the clamping plate 662 and the cylinder 684 to move the blocking member 681 against the trailing side of the sheet. However, after the preheating interval, the cylinders 564 of both soldering units then move the associated arms 557 to locate the feeding devices 553 and the lengths of solder wire 550 into position with regard to the soldering tips 529 of each unit. This acts to carry out soldering of both bus bars B simultaneously on the oppositely disposed electrodes. The arms 557 of each unit 50 then are swung rearwardly and the platform 601 is lowered. After the plugs 631 of the locator devices 630 and the plug 641 of the positioning device 640 have been moved downwardly to positions below the undersurface of the sheet and movement of the sheet is resumed. Now, when LS 3530 is tripped, the plugs 631 and 641 are again raised and the sheet in the receiving station R' can be advanced into the soldering station ST. As the "lead" sheet approaches the exit area of the discharge station D', LS 4050 is tripped to halt further progress as has been described in connection with LS 405 and its control of operation of the motor 400 as in FIG. 16.

It will be evident that, in lieu of soldering irons as specifically described, small torches or means could be employed to heat the assembly to be soldered at spaced points. Indeed, it is to be understood that the forms of the invention herein shown and described are t be taken as preferred embodiments only and that various changes in the shape, size and arrangement of parts, as well as various procedural changes may be resorted to without departing from the spirit of the invention as defined in the following claims.

We claim:

1. Apparatus for soldering to a metallic strip on a sheet of glass a layer of metal assembled in contacting relationship therewith, comprising a plurality of spaced heating elements arranged in a pattern conforming generally to the shape of said layer of metal, means for moving said sheet along a definite path into and out of a position where said layer of metal is in substantial alignment with said heating elements, means for elevating said sheet from said path when the sheet is in said substantially aligned position, means associated with said elevating means for supporting said sheet for free movement in the plane of said support, and means for moving, accurately aligning and clamping said sheet on the supporting means whereby said elevating means will bring said layer assembly into operative soldering relationship with said heating elements.

2. Apparatus as defined in claim 1, wherein said means for moving, aligning and clamping said sheet are operable during movement of said elevating means from said path.

3. Apparatus as defined in claim 1, wherein said layer of metal is a permeable layer, and in which said heating elements are soldering irons having soldering tips, said tips are in contact with said layer of metal when in operative soldering relationship with said layer, means are provided for resiliently urging said tips toward said layer during said contact, means for simultaneously feeding a separate supply of solder to said layer at each of said soldering iron tips, and means for swinging said feeding means into and out of operative relationship with said tips.

4. Apparatus as defined in claim 1, wherein said path and sheet supporting means are disposed substantially horizontally, means for locating said sheet in said substantially aligned position including spaced stop means engageable with a leading edge of said sheet for interrupting movement thereof along said path, and wherein said means for moving, accurately aligning and clamping said sheet include additional stop means at one side of said path movable with said elevating means and means for urging said sheet towards and against said additional stop means.

5. Apparatus as defined in claim 4, wherein said means for moving, accurately aligning and clamping said sheet include further stop means normally in but movable out of said path by a sheet moving therealong, and means for moving said further stop means into contact with the following edge of a sheet that has moved therepast.

6. Apparatus as defined in claim 5, wherein said first mentioned spaced stop means are at opposite sides of the longitudinal centerline of said path, said last mentioned further stop means are positioned to urge said sheet toward and against said spaced stop means, and both said first and last mentioned stop means are movable with said elevating means.

* * * * *